3,687,762
METHOD OF MAKING A VOID FREE FILAMENT WOUND ARTICLE
Jack Lowrie McLarty, Milwaukee, Wis., assignor to Universal Oil Products Company, Des Plaines, Ill.
No Drawing. Filed Oct. 5, 1970, Ser. No. 78,280
Int. Cl. B65h 81/00
U.S. Cl. 156—175         8 Claims

ABSTRACT OF THE DISCLOSURE

A method of making a void free resin impregnated glass reinforced filament wound article. When produced without coloring agents, the article is transparent. Deaeration is achieved by precuring the article after filament winding. That is, the article is heated to a temperature less than the temperature at which hardening to the B-stage will occur. This precuring temperature is maintained for at least about 24 hours before the temperature is raised and the curing process is initiated. The properties of the materials used in the resin mix and the temperatures and time intervals at which the steps of this invention are carried out are determinative of the degree of success achieved.

---

This invention relates to a method of making a void free resin impregnated glass reinforced filament wound article. When produced without coloring agents, the article is transparent. Deaeration is achieved by precuring the article after filament winding. That is, the article is heated to a temperature less than the temperature at which hardening to the B-stage will occur. This precuring temperature is maintained for at least about 24 hours before the temperature is raised and the curing process is initiated. The properties of the materials used in the resin mix and the temperatures and time intervals at which the steps of this invention are carried out are determinative of the degree of success achieved.

In the production of filament wound articles, a need frequently arises for void free glass reinforced articles. The electrical properties of void free filament wound articles are quite superior as compared with identical articles produced without deaeration of the resin. That is, a void free article is a more perfect dielectric material. In addition, the absence of air between the filaments and the resin increases the ability of the resin to transfer loads between filaments and thereby improves the interlaminar shear strength. This shear strength in conventional filament wound articles is normally about 5,000 pounds per square inch. This value is increased to about 10,000 p.s.i. using the same epoxy resin mixes and the method of manufacture of this invention. The shear strength is particularly important in items where bending or flexing occurs, such as in beams and springs. It is also important where the filament wound article is subjected to torsional forces, as in shafts. In addition, an evacuated resin lengthens the life of filament wound articles by increasing the resistance to permeation of chemicals or agents affecting the bonds between filaments and resin. A further purpose in producing a void free article is to remove the cloudiness in the article that is a characteristic of air entrapped therein. By removing the cloudiness, the article becomes transparent. This renders visible the interior of the article, allows printing on the article to be readily legible, or allows clear and sharp colors to be produced in the article, depending upon whether or not and in what form pigmentation is used.

Void free articles are currently produced by deaerating the thermosetting resin used in the production of the article. This deaeration conventionally is carried out prior to filament winding the article. Consequently, there is no removal of air bubbles which adhere to the glass filaments prior to wetting and which remain on the glass filaments even after the filaments are passed through the deaerated resin. Furthermore, after the filaments are passed through the deaerated resin, additional air pockets form on the filaments as they are wound onto a mandrel. This results in reintrapment of air and the production of voids in the finished product. In short, conventional resin deaeration does not effectively produce void free articles.

With existing problems in mind, it is an object of the present invention to produce a glass filament wound article and deaerate the resin used to the extent that a truly void free article is produced as an end product.

A further object is to produce a transparent glass reinforced filament wound article. Transparency is achieved if no dyes or other coloring agents are added to the resin mix.

A related object is to produce a glass filament wound article in which printing or designs are permanently incorporated with a high degree of resolution. Such printing or designs may be prevented from fading by being imparted to the article below the outer resin surface during filament winding. Since the article may otherwise be made transparent, the outer layer of resin or filaments and resin will not detract from the desired resolution.

In a broad aspect this invention is, in a method of making a filament wound article from glass filaments thoroughly wetted by any epoxy resin mix having a usable life of at least about 24 hours and a viscosity no greater than about 15,000 centipoises using a mandrel, the improvement comprising winding said glass filaments about said mandrel at a temperature of from about 70° F. to about 160° F. at a linear speed varying in a direct relation with the winding temperature and no greater than about 150 feet per minute to produce a filament wound article; rotating said filament wound article and simultaneously precuring said filament wound article by heating it to a temperature below that which will cause the resin to cure to the B-stage for at least about 24 hours, thereby deaerating said resin; and partially curing the resin mix in said filament wound article by gradually heating it to a temperature of at least about 180° F., until the resin reaches the B-stage of curing, and subsequently gradually raising the temperature of said filament wound article to at least about 290° F. for at least about one hour prior to removing said mandrel from said filament wound article.

For most epoxy resins, precuring should take place between about 85° F. and 150° F. When produced without coloring agents, the step of deaeration during precuring renders the filament wound article transparent. As previously mentioned, this transparency is quite useful in a number of different situations.

The method of this invention may be used in the production of glass reinforced filament wound pipes, vessels, and other articles. It may be produced using the same conventional equipment currently used in the production of conventional filament wound articles.

It is important that the resin mix used have a viscosity no greater than approximately 15,000 centipoises. This feature allows the resin to readily flow into the voids vacated by air escaping from the resin mix during deaeration in the precuring step. The resin mix must have a usable life of approximately 24 hours or longer so that deaeration may be carried through to completion. The glass filaments used must have a smooth finish and are inevitably coated with a primer or laminate in their manufacture. This primer may be composed of a wide variety of materials, but one very workable form of the primer for the purposes of this invention is a primer comprised of a silane base. In addition, there is an advantage to using glass filaments having a small diameter, since the degree of deaeration will vary inversely with the diameter of the glass filaments if other materials and conditions are held constant. Preferably, the glass filaments are wetted with the resin mix to the extent that the content of the filaments wound on the mandrel includes from 100 to 200 percent resin volume as compared with the glass filament volume prior to coating with the resin. To minimize air entrapment during filament winding, either a high winding temperature or a low filament winding speed should be used. The filament winding speed, therefore, may vary in a direct relation with the filament winding temperature in order to meet minimum standards for void content in a finished product. For example, in order to produce a filament wound article having a stated maximum void content, glass filaments may be wound about the mandrel at a temperature of about 160° F. and at a linear speed of about 150 feet per minute, or they may be wound at a temperature of about 70° F. and a linear speed of about 15 feet per minute, or an intermediate combination of temperature and winding speed may be used.

A preferred form of the resin mix is comprised of an epoxy resin derived from bisphenol A and epichlorohydrin, an anhydride hardener, and an amine accelerator. Such epoxy resin systems have been successfully used to produce high quality void free filament wound articles.

The method of this invention is more fully described in the following example.

EXAMPLE

Conventional filament winding equipment including a mandrel, a filament winding machine having an arm reciprocally mounted with respect to the mandrel, and ovens or other heating means, is used to produce a filament wound article according to the method of this invention. Glass filaments of a small diameter and having a smooth finish are first thoroughly wetted by an epoxy resin mix. The glass filaments, for purposes of illustration, may be filaments manufactured by the Pittsburg Plate Glass Company with a finish designation of 1064, and a strand diameter of .00050 to .00055 inches diameter. The resin mix used is comprised of an epoxy resin derived from bisphenol A and epichlorohydrin, anhydride hardener composed of hexahydrophthalic anhydride, and an accelerator comprised of a low viscosity tertiary amine salt. The relative portions by weight of the resin mix include about 53 percent resin, about 45 percent hardener, and about 2 percent accelerator.

To produce a filament wound article, the mandrel begins rotation and the glass filaments are passed through a bath containing the aforesaid resin mix. From the resin bath, the coated filaments are passed to the reciprocating delivery arm and then onto the mandrel. The coated glass filaments are helically wound about the mandrel at a temperature of about 100° F. and at a linear speed of about 60 feet per minute. It should be noted that while the winding temperature may vary from about 70° F. to about 160° F., the linear speed of winding should vary from about 15 feet per minute to about 150 feet per minute in a direct relationship with the winding temperature. The filament wound article is produced from the coated glass filaments once winding is complete. Excess resin on the surface of the filament wound article is not removed with a squeegee, as is sometimes done in conventional filament winding operations. Instead, the resin is allowed to fall freely and is drained into a container for reuse. The filament wound article is next precured by maintaining it at a temperature of between 100° F. and 120° F., preferably about 110° F. A slightly lower or considerably higher temperature may be required for precuring resin mixes other than those illustrated by way of this example. The precuring temperature is continued for from between 24 hours to as long as 72 hours until the filament wound structure is relatively void free and the glass filaments are not readily observable. Rotation of the mandrel is continued during this time to prevent excess resin drainoff from the glass filaments.

The resin mix in the filament wound article is next partially cured by gradually heating it to a temperature of between 180° F. and 190° F. until the resin reaches the B-stage of curing. Resin mixes other than those illustrated in this example may require slightly lower or considerably higher temperatures in order to reach the B-stage. Heating is continued in any case until a B-stage of hardness is obtained. This normally takes about two hours. Thereafter, final curing is initiated. This is done by slowly raising the temperature of the filament wound article to between about 290° F. and 310° F., preferably to about 300° F. The temperature rise is uniform and is conducted over a period of about one half hour. The final curing temperature is maintained for between one and a half to two hours. Again, different resin mixes may require higher or lower final curing temperatures. After final curing, the filament wound article is cooled for an hour or more to about 150° F. or lower before removal from the mandrel. The filament wound article is then ready for use. The volume percentage of voids between fiber and resin in the article is less than .2%. The article is transparent and the strands or filaments of glass are invisible to an ordinary inspection of the piece.

The foregoing example of the manner of performing the method of this invention is for purposes of illustration only, and no unnecessary limitations should be construed therefrom as other modifications will be obvious to those skilled in the art of producing resin impregnated filament wound articles. For example, epoxy resin mixes utilizing wide varieties of hardeners and accelerators may be substituted for the resin mix of the example.

The invention claimed:

1. In a method of making a filament wound article from glass filaments thoroughly wetted by an epoxy resin mix having a usable life of at least about 24 hours and a viscosity no greater than about 15,000 centiposes using a mandrel, the improvement comprising:
   (a) winding said glass filaments about said manderl at a temperature of from about 70° F. to about 160° F. at a linear speed varying in a direct relation with the winding temperature and no greater than about 150 feet per minute to produce a filament wound article;
   (b) deaerating said resin in said filament wound article by rotating said filament wound article for at least about 24 hours and simultaneously precuring said filament wound article at a temperature in said range of about 70° F. to about 160° F. and which temperature is below that which will cause the resin to cure to the B-stage; and,
   (c) partialy curing the resin mix in said filament wound article by gradually heating it to a temperature of at least about 180° F., until the resin reaches the B-stage of curing, and subsequently gradually raising the temperature of said filament wound article to at least about 290° F. and at least about one hour prior to removing said mandrel from said filament wound article.

2. The method of claim 1 wherein said resin mix is comprised of an epoxy resin derived from bisphenol A and epichlorohydrin, an anhydride hardener, and an amine accelerator.

3. The method of claim 1 wherein said glass filaments have a smooth finish and are coated with a silane base prior to filament winding.

4. The method of claim 1 further characterized in that said glass filaments are wound at a temperature of about 160° F. at a linear speed of about 150 feet per minute.

5. The method of claim 1 further characterized in that said glass filaments are wound at a temperature of about 70° F. at a linear speed of about 15 feet per minuté.

6. The method of claim 1 wherein the volume of resin mix wetted onto said glass filaments is at least about 100% of the volume of said glass filaments.

7. The method of claim 1 wherein precuring is carried out at a temperature of between about 85° F. and about 150° F.

8. In a method of making a transparent filament wound article from glass filaments thoroughly wetted by an epoxy resin mix having a usuable life of at least about 24 hours and a viscosity no greater than about 15,000 centipoises using a mandrel the improvement comprising:

(a) winding said glass filaments about said mandrel at a temperature of from about 70° F. to about 160° at a linear speed no greater than about 150 feet per minute to produce a filament wound article;

(b) deaerating said resin in said filament wound article and thereby rendering said filament wound article transparent by rotating said filament wound article for at least about 24 hours and simultaneously precuring said filament wound article at a temperature in said range of about 70° F. to about 160° F. and which temperature is below that which will cause the resin to cure to the B-stage; and, (c) partially curing the resin mix in said filament wound article by gradually heating it to a temperature of at least about 180° F., until the resin reaches the B-stage of curing, and subsequently gradually raising the temperature of said filament wound article to at least about 290° F. for at least about one hour prior to removing said mandrel from said filament wound article.

References Cited

UNITED STATES PATENTS

| | | | |
|---|---|---|---|
| 3,480,499 | 11/1969 | Paul, Jr. | 156—175 |
| 3,562,081 | 2/1971 | Stalego | 156—330 X |
| 3,258,379 | 6/1966 | Ponemon et al. | 156—175 |
| 3,068,134 | 12/1962 | Cilker et al. | 156—286 X |
| 3,033,729 | 5/1962 | Shobert | 156—175 UX |
| 3,341,387 | 9/1967 | Boggs | 156—175 |
| 3,281,299 | 10/1966 | Shobert | 156—175 |

CARL D. QUARFORTH, Primary Examiner

E. E. LEHMAN, Assistant Examiner

U.S. Cl. X.R.

156—173, 296, 330